3,043,843
DYESTUFFS OF THE PERYLENE TETRACARBOXYLIC ACID DIIMIDE SERIES

Jacob Koch, Basel, Switzerland, assignor to Ciba Limited, Basel, Switzerland
No Drawing. Filed Dec. 1, 1959, Ser. No. 856,354
Claims priority, application Switzerland Dec. 5, 1958
1 Claim. (Cl. 260—281)

The present invention provides new dyestuffs of the perylene tetracarboxylic acid diimide series of the general formula

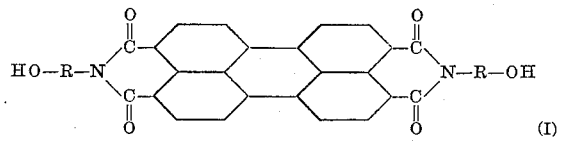

in which R represents a phenyl or diphenyl radical, preferably such a radical having the hydroxyl group in para-position to the imino group or to the phenylene radical, and the perylene radical may be substituted, for example, by a halogen atom or alkoxy group.

The present invention also provides a process for the manufacture of the above mentioned dyestuffs, wherein perylene-3:4:9:10-tetracarboxylic acid or its dianhydride or a derivative of such acid or dianhydride substituted in the perylene radical, is condensed with an amino-hydroxy-benzene or an amino-hydroxy-diphenyl at a raised temperature, or wherein the isopropyl groups are split off from the diisopropyl ether of a compound of the Formula I, preferably by treatment with aqueous sulfuric acid advantageously of 80% to 90% strength at a temperature within the range of 20–70° C.

As examples of amino-compounds used as starting materials in the present process, there may be mentioned 4-amino-phenol and 4-amino-4'-hydroxy-diphenyl.

The condensation of the starting material may be carried out by subjecting them for a time to a simple heat treatment, advantageously at a temperature within the range of 150–200° C., and if desired, in the presence of an agent capable of eliminating water such, for example, as zinc chloride. The reaction may be carried out in the absence of a diluent, or in the presence of a high-boiling inert diluent such, for example, as nitro-benzene or dimethyl formamide. The condensation may equally well be carried out in the presence of water as diluent. In the latter case, the reaction is advantageously carried out at a temperature within the range of 150–220° C.

After complete reaction of the perylene-3:4:9:10-tetracarboxylic acid used as starting material, the condensation product is preferably treated with a dilute acid, advantageously at raised temperature, in order to free it from any residual amine. By heating the condensation product in the presence of dilute sulfuric acid, it is obtained in the form of uniform needles.

The compounds of this invention are valuable pigments, which, after being brought into a finely divided form, may be used for colouring organic products, such, for example, as lacquers and plastic masses, and for the manufacture of printing colours, and for the spin-dyeing of synthetic fibers, for example, of viscose rayon, cellulose acetate rayon, nylon or a polyester. After having brought the pigments into a finely divided form, red dyeings having excellent fastness to light and to migration are obtained. The dyestuffs may be brought into a finely divided form, for example, by dissolving them in concentrated sulfuric acid and reprecipitating them with water, or by milling the crude pigment in the presence of a dispersing agent. Especially brilliant pigments are obtained by dissolving the crude product in a large excess of a dilute solution of an alkali metal hydroxide, whereby ring fission of the dyestuff molecule probably takes place, and then re-precipitating the product by the addition of an acid, whereby re-closure of the imide ring is brought about, or by milling the crude pigment in a dry or aqueous moist state in the presence of a solid diluent, preferably in the presence of a water-soluble salt and a solid or liquid organic solvent. The above mentioned treatment of the crude material very probably brings about modification of the crystal structure.

The pigment obtained by condensation of 4-amino-4'-hydroxy diphenyl with perylene-tetracarboxylic acid is a valuable vat dyestuff. Thus, for example, by using it to dye cotton in a ruby-red vat, a very strong, bluish-red dyeing is obtained.

The following examples illustrate the invention, the parts and percentages being by weight unless otherwise indicated:

Example 1

3.9 parts of perylene-3:4:9:10-tetracarboxylic acid dianhydride and 80 parts of para-amino phenol are milled, in the dry state, in a roller drum, until a homogeneous mixture is obtained. The mixture is then transferred to an open stirring vessel which is heated on an oil bath to 220° C. After the mixture has become liquid, it is stirred for half an hour at a bath temperature of 220° C. The mixture is then allowed to cool. The solidified product is removed from the stirring vessel and pulverized. The powdered product is then boiled twice in 1000 parts by volume of a 10% solution of hydrochloric acid in order to bind the excess para-amino-phenol. The product is then filtered, washed neutral and finally dried. The dyestuff thus obtained is a brownish-red powder that contains no unchanged perylene-tetracarboxylic acid, and the yield is equivalent to 90% of theory.

The dyestuff can also be obtained in the form of uniform needles by treatment with sulfuric acid. For this purpose, for example, four parts of the dyestuff are added, at room temperature, to 240 parts of sulfuric acid of 80% strength, and the mixture is heated with stirring at 80 to 85° C. In this manner, the suspended dyestuff particles are completely transformed into fine needles, and the colour of the suspension changes from reddish-brown to red and acquires a crystalline sheen. After cooling, the mixture is filtered with suction, the residue is washed with sulfuric acid of 75% strength until the filtrate is colourless, and then with water until the filtrate has a neutral reaction, and finally dried. A brownish-red crystalline product is thus obtained in excellent yield.

By using an 85% solution of sulfuric acid instead of an 80% solution, it suffices to warm the suspension to 50° C. in order to convert the dyestuff into the form of needle-shaped crystals.

The dyestuff can be obtained in a form suitable for colouring plastic masses with clear shades, by dissolving it advantageously in dilute aqueous alkali-metal hydroxide solution, and then reprecipitating it from this solution by the addition of an acid. If desired, the alkali dyestuff solution can be filtered before the acid is added. The amount of the particular alkali sufficient to convert the two phenolic hydroxyl groups into phenolates dissolves, even at raised temperature, only 10% of the dyestuff applied. In order to ensure complete dissolution of the dyestuff, four times of this amount of alkali is necessary. Thus, for example, 80 parts by volume of normal potassium hydroxide solution are required for the complete dissolution of 5.75 parts of dyestuff suspended in 575 parts of water. This dissolution apparently brings about ring fissure of the dyestuff molecule, but reclosure takes place on addition of the mineral acid.

The pigment obtained after treatment in alkali hydroxide solution, and after being dried and rendered into a finely divided form, can be used for colouring plastic masses or lacquers or for colour-printing. These dyeings or printings yield pink-coloured tints of considerable clarity and of very good fastness properties.

*Example 2*

6.6 parts of perylene-3:4:9:10-tetra-carboxylic acid-N:N'-di-para-isopropoxy-phenylimide, obtained by condensation of perylene-3:4:9:10-tetracarboxylic acid dianhydride with para-isopropoxy-aniline, are added with stirring to 330 parts of sulfuric acid of 85% strength. The dyestuff solution thus obtained has a violet colouration. However, before a complete solution is obtained, the saponified dyestuffs starts to crystallize out as brownish orange needles of perylene-tetra-carboxylic acid-di-para-hydroxy-phenylimide.

Stirring the mixture is continued until a sample thereof is completely soluble in an excess of dilute aqueous alkali-metal hydroxide solution, and this requires continuous stirring for about half an hour. The crystalline product is then filtered off under suction, washed with a small amount of sulfuric acid of 80% strength until the filtrate is colourless, then with water until the filtrate has a neutral reaction, and finally dried. A brownish-red crystalline product is obtained in practically theoretical yield.

The hydrolyzis of the isopropoxy groups can also be carried out in sulfuric acid of concentrations other than that of 85%. When a solution of sulfuric acid of 80% strength is used, in which the starting material is still soluble to a certain extent, the hydrolyzis takes 15–20 hours when carried out at room temperature; if this hydrolyzis is carried out at 60° C. it is complete after 20–30 minutes. During the reaction, the colour of the suspension changes from brownish-red to red.

In sulfuric acid of 90% strength at room temperature, both the starting material and the dihydroxy compound obtained after hydrolyzis are completely soluble. In order to obtain the end-product in the form of needle-shaped crystals, water must be added to the sulfuric acid solution until the concentration thereof is reduced to 80% strength, and during this treatment it must be ensured that the temperature does not rise above 70° C.

The dyestuff obtained in the above manner is identical with that obtained in Example 1. Advantageously, before using the pigment dyestuff for colouring or printing, it is dissolved in dilute aqueous alkali hydroxide solution and reprecipitated from it by the addition of an acid.

*Example 3*

20 parts of water, 5.3 parts of glacial acetic acid and 3.3 parts of 1-amino-4-hydroxybenzene are introduced into a pressure vessel. A solution obtained by warming 3.9 parts of perylene-3:4:9:10-tetra-carboxylic acid dianhydride in 74 parts of a potassium hydroxide solution of 5.4% strength is added to the mixture, and the vessel is then rotated for 10 hours at 170–175° C. After cooling, the vessel is opened and the resulting dyestuff is isolated by filtration, boiled in dilute hydrochloric acid in order to bind any excess base still present, and then dried. The yield of dyestuffs is practically quantitative. The dyestuff contains no unchanged perylene-tetra-carboxylic acid.

The dyestuff is identical with that described in Example 1. It can be crystallized in the form of needles from sulfuric acid and dissolved in dilute aqueous alkali hydroxide solution and reprecipitated from it by the addition of an acid in the manner described in Example 1.

*Example 4*

20 parts of water, 5.3 parts of glacial acetic acid and 5.6 parts of 4-amino-4'-hydroxy-diphenyl are introduced into a pressure vessel. A solution obtained by warming 3.9 parts of perylene-3:4:9:10-tetra-carboxylic acid-dianhydride in 74 parts of a potassium hydroxide solution of 5.4% strength is added to the mixture, and the vessel is then rotated for 10 hours at 200 to 210° C. After cooling, the vessel is opened and the dyestuff is filtered off, boiled in dilute hydrochloric acid in order to bind any excess base still present, and finally dried. The yield of dyestuff is substantially quantitative. It contains no unchanged perylene-tetra-carboxylic acid.

This dyestuff is insoluble in dilute aqueous alkali-metal hydroxide solution, but it is readily vattable after the addition thereto of sodium dithionite. As a ruby-red vat dyestuff, it colours cotton material with very strong clear bluish-red tints.

Polyvinyl chloride foils may be coloured with clear tints by treating the dyestuff, advantageously by a milling treatment, with a solid auxiliary agent. For example, 10 parts of the dyestuff are milled with 25 parts of anhydrous sodium sulfate, 4 parts of anhydrous sodium acetate, 2.5 parts of para-dichlorobenzene and 0.5 part of the condensation product of naphthalene-2-sulfonic acid and formaldehyde, in a stainless steel roller-drum until two consecutive samples no longer differ with respect to their clarity and intensity of pink shade.

The dyestuff may be revatted prior to the above milling treatment.

*Example 5*

A mixture of 65 parts of polyvinyl chloride, 35 parts of dioctyl phthalate and 0.2 part of the dyestuff obtained in Example 1 paragraphs 1 and 4 in a finely divided form, is stirred, and the mixture is then rolled backwards and forwards on a double-roller calender for 7 minutes at 140° C. A pink-coloured foil having very good fastness to light and to migration is thus obtained.

What is claimed is:

The perylene tetracarboxylic acid diimide of the formula

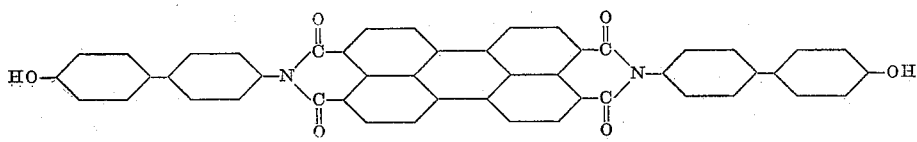

References Cited in the file of this patent

UNITED STATES PATENTS

| | | |
|---|---|---|
| 2,054,334 | Nawiasky et al. | Sept. 15, 1936 |
| 2,543,747 | Shrader | Mar. 6, 1951 |
| 2,890,220 | Eckert et al. | June 9, 1959 |

FOREIGN PATENTS

| | | |
|---|---|---|
| 464,438 | Canada | Apr. 18, 1950 |